United States Patent [19]

Jurca

[11] Patent Number: 4,757,712

[45] Date of Patent: Jul. 19, 1988

[54] ELECTRIC MONITORING SYSTEM FOR LOAD HANDLING VEHICLES

[75] Inventor: Zeljko T. Jurca, Etobicoke, Canada

[73] Assignee: Alert-O-Brake Systems, Inc., Mississauga, Canada

[21] Appl. No.: 55,859

[22] Filed: Jun. 1, 1987

[51] Int. Cl.[4] .............................. G04F 10/00
[52] U.S. Cl. ..................... 73/432.1; 368/8
[58] Field of Search ............... 73/117.3, 117.2, 118.1, 73/432.1; 340/52 F, 679, 685, 686, 689, 517, 521, 526; 368/6, 8; 377/9, 19; 346/20

[56] References Cited

U.S. PATENT DOCUMENTS

| | | | |
|---|---|---|---|
| 1,414,910 | 5/1922 | Watson | 368/8 |
| 3,792,445 | 2/1974 | Bucks et al. | 73/117.3 |
| 4,068,773 | 1/1978 | Downing et al. | 340/685 |
| 4,411,577 | 10/1983 | Shearer, Jr. | 340/686 |
| 4,478,521 | 10/1984 | Evans et al. | 340/52 F |
| 4,500,868 | 2/1985 | Tokitsu et al. | 340/52 F |
| 4,516,116 | 5/1985 | White | 340/665 |

FOREIGN PATENT DOCUMENTS

| | | | |
|---|---|---|---|
| 2751659 | 6/1978 | Fed. Rep. of Germany | 340/679 |
| 0175241 | 10/1982 | Japan | 73/117.3 |

*Primary Examiner*—Stewart J. Levy
*Assistant Examiner*—Robert R. Raevis

[57] ABSTRACT

The invention provides an electric monitoring system for use in association with a load handling vehicle, such as a fork lift truck. The system provides a number of transducers and switches operable in response to operating conditions of the vehicle such as whether it is loaded or unloaded, and whether it is stationary or being driven, and gating circuitry interconnects these transducers and switches with a variety of timers and counters which record the various modes of use of the vehicle during a working shift.

15 Claims, 3 Drawing Sheets

ELECTRIC MONITORING SYSTEM FOR LOAD HANDLING VEHICLES

FIELD OF THE INVENTION

This invention relates to an electric monitoring system for use in association with load handling vehicles such as for example, fork lift trucks.

BACKGROUND OF THE INVENTION

Industrial trucks such as fork lift trucks, front end loaders, and the like, are special purpose vehicles designed to lift, transport and stack loads. Their economic utility in industry depends not only upon the extent to which they are used, but also upon the manner in which they are used. That is to say, it is important to know the extent to which the various capabilities of an industrial truck are utilized.

SUMMARY OF THE INVENTION

The present invention provides a system for monitoring the pattern of usage of a load handling vehicle, such as an industrial truck. Basically, the system includes a plurality of transducers responsive to different physical operations of the vehicle, a plurality of timers each assigned to record a selected mode of vehicle usage, and gating circuitry interconnecting the timers with an electric supply, the gating circuitry including selector switches responsive to the transducers.

Thus, according to one aspect of the invention there is provided an electric monitoring system for use in association with a load handling vehicle to record the pattern of vehicle usage, comprising supply circuit means including an on-off switch operable to activate the system; timer means coupled to said supply circuit means and responsive thereto in accordance with the operation of said switch for timing the activation of the system; first transducer means for detecting the presence of a vehicle load; second transducer means for detecting vehicle motion; a plurality of timer circuits each including a respective timer; and gating circuit means interconnecting said timers with said supply circuit means. The gating means comprises first selective switching means responsive to said first transducer means and operable thereby in accordance with the presence of a vehicle load, second selective switching means responsive to said second transducer means and operable thereby in accordance with the detection of vehicle motion, and circuit means interconnecting said selective switching means with the supply circuit means and said timers for selectively activating said timers in accordance with the respective conditions of said selective switching means.

In a preferred embodiment of the invention described hereinafter, the monitoring system provides additional timing and counting functions.

One embodiment of the invention as applied to a fork lift truck, will now be described by way of example with reference to the accompanying drawings.

DESCRIPTION OF THE PREFERRED EMBODIMENT

Figure 1:
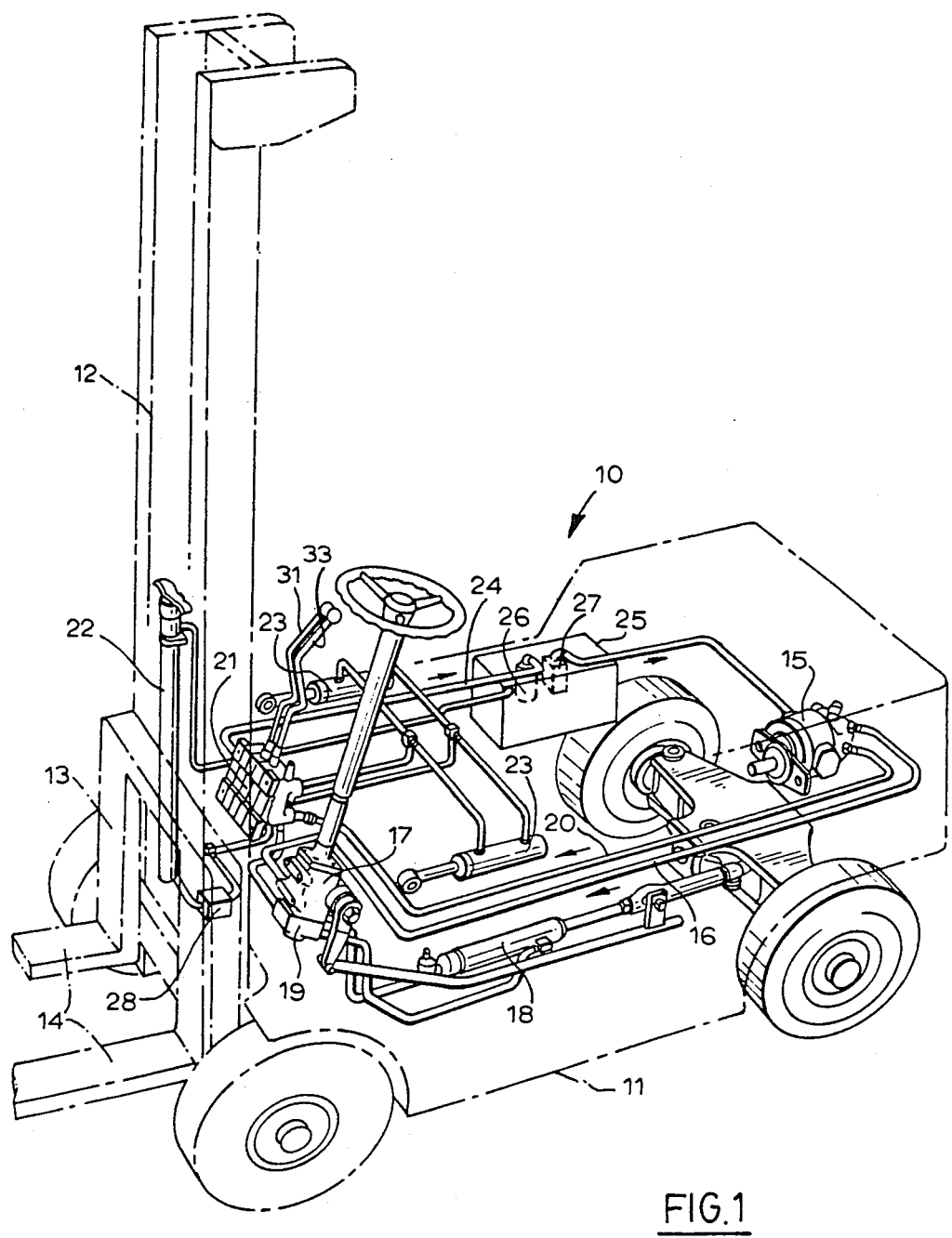
FIG. 1 shows the lay-out of the hydraulic system of a fork lift truck provided with a monitoring system according to the invention.

The fork lift truck 10 of FIG. 1 is representative of one type of load handling vehicle. The body 11 of the truck, the mast 12 and the fork lift 13 are shown in chain-dot outline so as not to obscure the hydraulic system which provides power for raising and lowering the fork lift 13, extending and retracting the fork arms 14, and tilting the mast 12 as may be required about a horizontal axis.

The hydraulic system comprises a hydraulic pump 15 which supplies fluid under pressure via a line 16 to a power steering control 17, which is interconnected with a power cylinder 18 via a control valve 19. The pump 15 also supplies fluid by way of a line 20 and a hydraulic control valve 21 to a lift cylinder 22 for raising and lowering the fork lift 13, and a pair of tilt cylinders 23 for tilting the mast 12. Fluid is returned to the pump 15 by way of a return line 24 and tank 25, the latter incorporating a return filter 26 and a suction strainer 27.

The hydraulic system thus described is conventional. However, for the purpose of monitoring usage of the fork lift, a pressure transducer 28 is provided at the inlet to the lift cylinder 22. The pressure transducer 28, which provides an electrical output signal corresponding to the pressure in the lift cylinder, may be of any suitable type, one suitable pressure transducer being the the Barksdale Controls pressure tranducer Model No. 300H213C604K.

Figure 2:
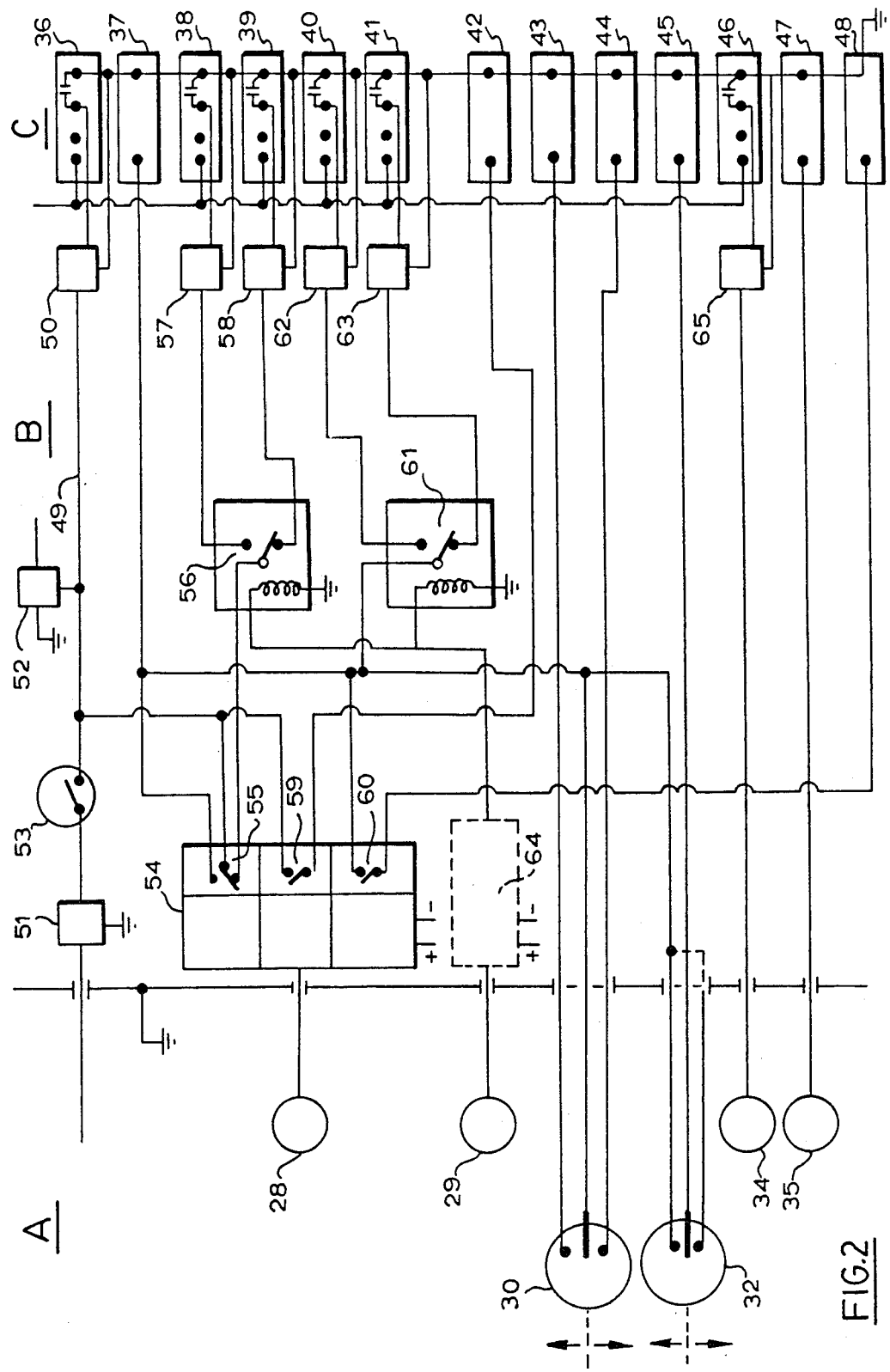
FIG. 2 is an electrical wiring diagram of the monitoring system.
Figure 3:
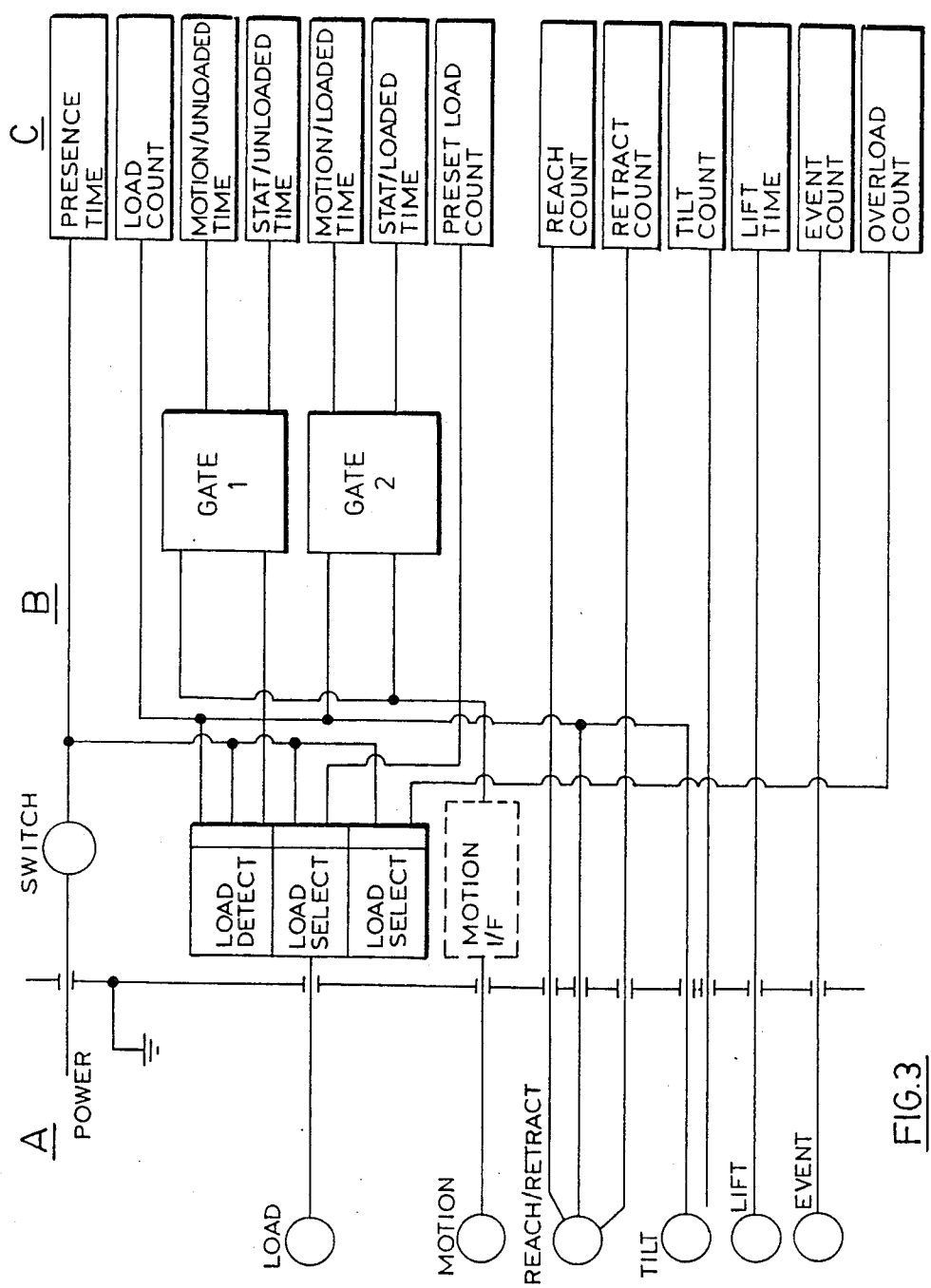
FIG. 3 is a block diagram showing the functional relationships of the components of the system.

Referring now to FIGS. 2 and 3, the monitoring system itself is made up of three basic parts, namely a set of tranducers, switches or the like, generally denoted by the reference A, a set of timers and counters generally denoted by the reference C, and circuitry including gating means, denoted by the reference B, interconnecting the components A with the counters and timers C.

The transducers and switches of section A are suitably mounted on the truck to detect its various physical operations and produce signals in accordance therewith. Thus the pressure transducer 28, as previously mentioned, is fitted at the inlet to the lift cylinder and produces an electric signal representative of the pressure in the cylinder and hence the load applied to the vehicle. A speed transducer 29, which may be a generator driven by the truck wheels, is suitably mounted to detect motion of the truck by generating a signal in response to motion of the truck. A microswitch 30, operated by movements of the control lever 31 (FIG. 1) for extending and retracting the fork arms, is provided to detect such movements. A microswitch 32, operated by movements of the control lever 33 (FIG. 1) for tilting the mast 12, is provided to detect such movements. A reed switch 34 operated by lifting of the fork lift 13 (FIG. 1) remains closed for the whole of the lift time. In a case where the truck is adapted to be fitted with a special load handling attachment, a microswitch 35 is preferably mounted so as to be operated by the fitting of such attachment.

The timers and counters of section C include a timer 36 for recording "presence time", that is to say, the duration of activation of the system; a counter 37 for counting and recording the number of applications of a load to the vehicle, as detected by the pressure transducer 28; a timer 38 for recording the time in which the truck is driven in an unloaded condition; a timer 39 for recording the time in which the truck is stationary in an unloaded condition; a timer 40 for recording the time in which the truck is driven in a loaded condition; and a timer 41 for recording the time in which the truck is stationary in a loaded condition. The section C also includes a counter 42 for recording the number of applications of loads in excess of a first predetermined value corresponding to a predetermined fraction of the specified maximum load; a counter 43 for recording the number of reach operations of the fork arms initiated by the control lever 31; a counter 44 for recording the number of retract operations of the fork arms initiated by the control lever 31; a counter 45 for recording the number of tilt operations of the mast 12 initiated by the control lever 33; a timer 46 for recording the total lift time in response to operation of the reed switch 34; a counter 47 for recording the number of "event" operations in response to the attachments of a special load handling appliance to the fork lift truck; and a counter 48 for recording the number of overloads, that is to say applications of a load to the truck in excess of the specified maximum load value.

Section C of the monitoring device provides a supply circuit 49 to which the timer circuit of the timer 36 is coupled by a relay 50. The supply circuit 49 is conveniently energized from a battery on the fork lift truck, and includes voltage regulators 51, 52 for maintaining a constant voltage. The supply circuit is activated by operation of an on-off switch 53, which an operator will turn on at the beginning of a working shift. The timer 36 is therefore responsive to operation of the switch 53 and so records the "presence time".

The timing circuits of timers 38, 39, 40, and 41 are interconnected with the pressure transducer 28 and the speed transducer 29 by way of gating circuitry which will now be described.

The pressure transducer 28, in response to the application of a load to the fork lift truck, actuates a selective switching means 54 including a first two-state switch 55 shown as a single-pole, double-throw switch. In FIG. 2 the switch 55 is shown in its normal, no-load condition. The common terminal of the switch 55 is connected to the supply circuit. One output terminal of the switch 55 is connected to the counter 37 while the other output terminal is connected to the common terminal of a second two-state switch 56. The output terminals of the switch 56 are connected respectively to the timer circuits of timers 38, 39 via relays 57, 58.

The two-state switch 55, is operated when a minimum load is applied to the truck. The switching means 54 also includes a first single-pole, single-throw switch 59 operable by the pressure transducer 28 in response to the application of a load exceeding a first predetermined value. A second single-pole, single-throw switch 60 is operable by the pressure transducer 28 in response to the application of a load exceeding a second predetermined value (specified maximum value) higher than the first.

When a load is applied to the vehicle, the switch 55 is operated so as to disconnect the switch 56 from the supply circuit 49 and to connect the common terminal of a third two-state switch 61 to the supply circuit. The output terminals of the switch 61 are connected respectively with the timer circuit of timers 40, 41 by way of relays 62, 63.

The switches 56 and 61, shown as single-pole, double-throw switches, are solenoid-operated switches responsive to the speed transducer 29 in accordance with the detection of vehicle motion. Depending upon the particular form of the transducer 29, an interface circuitry 64 between the speed transducer and the switches 56, 61 will usually be required.

The single-pole, double-throw switches 55, 56 and 61 thus constitute a first selective switching means operable in accordance with the presence of a vehicle load, and a second selective switching means operable by the detection of vehicle motion, the switches thus defining four different modes of usage of the fork lift truck, namely stationary/unloaded, stationary/loaded, driven unloaded, and driven/loaded. The duration of each mode of usage is recorded by the respective one of the timers 38, 39, 40, 41 in accordance with the condition of the switches.

The switch 59, operable by the pressure transducer 28, is interconnected with the counter 42 which responds to the switch operation by recording the number of load applications in excess of the first predetermined value. Similarly, the switch 60, also operable by the pressure transducer 28, is interconnected with the counter 48 which responds to the switch operation by recording the number of load applications in excess of the specified maximum value.

The microswitch 30 is interconnected with the supply circuit 49 by way of the switch 55 when the truck is loaded, and is operable in accordance with extension and retraction of fork arms to activate a counter 43 for recording the number of reach operations or a counter 44 for recording the number of retract operations.

Similarly, the microswitch 32 is interconnected with the supply circuit 49 by way of the switch 55 when the truck is loaded, and with the counter 45. The counter 45 responds to operation of the microswitch 32, by recording the number of tilt operations performed on the mast 12.

The reed switch 34, operated by lifting of the fork lift, is used to close a circuit for activating the timer 46, for recording the total lift time. The timer 46 is coupled to the circuit via a relay 65.

The switching device 35, operable by the fitting of an optional load handling attachment, is used to actuate the counter 47 for recording the number of such fittings.

The components shown in Sections B and C of the monitoring system may conveniently be housed in a common housing to be mounted on the fork lift truck, the housing being provided with a connector socket carrying the electrical connections to the transducers and switches of Section A and to the truck power supply.

To sum up, the monitoring system when activated at the beginning of a working shift and deactivated at the end of the working shift, by operation of the on-off switch 53, records the pattern of truck usage during the shift.

Thus, the timers and counters show:
the "presence time", i.e. duration of the shift;
the "truck stationary and unloaded" time;
the "truck driven and unloaded" time;
the "truck stationary and loaded" time;
the "truck driven and loaded" time;
the number of load applications;
the number of applications of a load exceeding a predetermined amount;
the number of load applications exceeding a specified maximum load;
the number of "reach" operations;
the number of "retract" operations;

the number of "tilt" operations;
the number of "lift time";
the number of "event" activations.

It will be understood that some of these functions may be regarded as options, and will not be required in certain types of industrial truck other than fork lift trucks. However, it is to be understood that the invention in its broadest aspect, by providing the first five functions listed above, and preferably the first eight, can be used in association with a variety of load handling vehicles other than fork lift vehicles.

Preferably, a printer facility will be coupled to the monitoring system. This facility will include a central processing unit coupled to the system via a buffer interface for processing the signals applied to the timers and counters, and a printer controlled by the central processing unit for printing the respective readings of said timers and counters.

I claim:

1. An electric monitoring system for use in association with a load handling vehicle to record the pattern of vehicle usage, comprising
   supply circuit means including an on-off switch operable to activate the system;
   timer means coupled to said supply circuit means and responsive thereto in accordance with the operation of said switch for timing the activation of the system;
   first transducer means for detecting the presence of a load applied to the vehicle;
   second transducer means for detecting vehicle motion;
   a plurality of timer circuits each including a respective timer;
   first selective switching means comprising a single-pole, double-throw switch responsive to said first transducer means and operable thereby in accordance with the presence of a vehicle load, and
   second selective switching means comprising a pair of single-pole, double-throw switches responsive to said second transducer means and operable thereby in accordance with the detection of vehicle motion, said second selective switching means selectively interconnecting the timer circuits in pairs with the first selective switching means for selectively activating said timers in accordance with the respective conditions of said first and said second selective switching means.

2. An electric monitoring system according to claim 1, said system including a counter coupled to said first selective switching means and responsive to operation of said first selective switching means for recording the number of applications of a vehicle load to the vehicle.

3. An electric monitoring system according to claim 2, further comprising a first single-pole, single-throw switch responsive to said first transducer means and operable thereby in accordance with detection of a vehicle load exceeding a first predetermined value, and a second counter operable by said first single-pole, single-throw switch for recording the number of applications of a vehicle load in excess of said first predetermined value.

4. An electric monitoring system according to claim 3, further comprising a second single-pole, single-throw switch responsive to said first transducer means and operable thereby in accordance with detection of a vehicle load exceeding a second predetermined value higher than the first, and a third counter operable by said second single-pole, single-throw switch for recording the number of applications of a vehicle load in excess of said second predetermined value.

5. In combination with an industrial lift truck having a load carrier supported by a tiltable mast, with power means for raising and lowering the load carrier along the mast, an electric monitoring system for recording the pattern of truck usage comprising
   first transducer means responsive to said power means for detecting the presence of a load on the load carrier,
   second transducer means for detecting motion of the truck,
   third transducer means responsive to raising of the load carrier,
   supply circuit means including an on-off switch, said supply circuit means including a first timer circuit including a timer responsive to operation of the on-off switch for timing the activation of said supply circuit means,
   a plurality of timer circuits, including second, third, fourth and fifth timer circuits, each including a respective timer assigned to record a selected mode of truck usage, and
   gating means interconnecting said timer circuits with the supply circuit means, said gating circuit means comprising
   first selective switching means responsive to said first transducer means and operable thereby in accordance with the presence of a load on said load carrier,
   second selective switching means responsive to said second transducer means and operable thereby in accordance with the detection of truck motion,
   circuit means interconnecting said first and second selective switching means with the supply circuit means and said timer circuits for selectively activating the timers thereof in accordance with the respective conditions of said first and said second selective switching means, thereby to record the durations of said selected modes of truck usage,
   a first counter coupled to said first selective switching means and responsive to operation of the first selective switching means for recording the application of a vehicle load, and
   a sixth timer circuit coupled to said third transducer means, the sixth timer circuit including a timer assigned to record the total lift time of the load carrier.

6. The combination claimed in claim 5, further comprising means for sensing tilting of the mast, and a second counter coupled to said sensing means for recording the number of tilt activations.

7. The combination claimed in claim 6, further comprising means for detecting reach and retract operations of the load carrier, and third and fourth counters coupled to said detecting means for recording the number of reach operations and the number of retract operations, respectively.

8. The combination claimed in claim 7, wherein said first selective switching means comprises a single-pole, double-throw switch operable by said first transducer means from a first to a second position, and said second selective switching means comprises a pair of single-pole, double-throw switches each operable by said second transducer means from a first to a second position, said second selective switching means selectively interconnecting the second, third, fourth and fifth timer circuits in pairs with the first selective switching means.

9. The combination claimed in claim 8, further comprising a first single-pole, single-throw switch responsive to said first transducer means and operable thereby in accordance with detection of a truck load exceeding a first predetermined value, and a fifth counter operable by said first single-pole, single-throw switch for recording the number of applications of a truck load in excess of said first predetermined value.

10. The combination claimed in claim 9, further comprising a second single-pole, single-throw switch responsive to said first transducer means and operable thereby in accordance with detection of a truck load exceeding a second predetermined value higher than the first, and a sixth counter operable by said second single-pole, single-throw switch for recording the number of applications of a truck load in excess of said second predetermined value.

11. An electric monitoring system for use in association with a load handling vehicle to record the pattern of vehicle usage, comprising
   first transducer means for detecting the presence of a vehicle load,
   second transducer means for detecting vehicle motion,
   supply circuit means including an on-off switch operable to activate the monitoring system,
   a first timer coupled to said supply circuit means and responsive thereto in accordance with the operation of said switch for timing the activation of the system,
   a first two-state switch having a common terminal connected to said supply circuit means and a pair of output terminals, said first two-state switch being responsive to said first transducer means and operable thereby in accordance with the presence of a vehicle load,
   a second two-state switch having a common terminal connected to one output terminal of said first two-state switch and a pair of output terminals,
   a third two-state switch having a common terminal connected to the other output terminal of said first two-state switch and a pair of output terminals,
   said second and third switches being responsive to and operable by said second transducer means in accordance with the detection of vehicle motion, and
   a plurality of timer circuits interconnected respectively with said output terminals of the second and third switches, each timer circuit including a timer assigned to record a selected mode of vehicle usage in accordance with the configurations of said switches.

12. An electric monitoring system according to claim 11, wherein the two-state switches are solenoid-operated single-pole, double-throw switches.

13. An electric monitoring system according to claim 12, including a first counter interconnected with said first two-state switch and operable thereby for recording the applications of a vehicle load.

14. An electric monitoring system according to claim 13, further comprising a first single-pole, single-throw switch responsive to said first transducer means and operable thereby in accordance with detection of a vehicle load exceeding a first predetermined value, and a second counter operable by said first single-pole, single-throw switch for recording the number of applications of a vehicle load in excess of said first predetermined value.

15. An electric monitoring system according to claim 14 further comprising a second single-pole, single-throw switch responsive to said first transducer means and operable thereby in accordance with detection of a vehicle load exceeding a second predetermined value higher than the first, and a third counter operable by said second single-pole, single-throw switch for recording the number of applications of a vehicle load in excess of said second predetermined value.

* * * * *